United States Patent [19]

Udaka et al.

[11] 4,220,527

[45] Sep. 2, 1980

[54] METHOD OF CLEANING PHOSPHORUS-CONTAINING WASTE WATER BY MICROORGANISMS

[75] Inventors: Shigezo Udaka; Makoto Shoda, both of Nagoya, Japan

[73] Assignee: President of Nagoya University, Aichi, Japan

[21] Appl. No.: 4,285

[22] Filed: Jan. 17, 1979

[30] Foreign Application Priority Data

Jan. 23, 1978 [JP] Japan .................................. 53-6061

[51] Int. Cl.$^2$ .............................................. C02B 1/06
[52] U.S. Cl. ..................................... 210/12; 210/906; 435/262
[58] Field of Search ................... 195/2, 96; 210/2, 11, 210/DIG. 29, 15, 12; 435/262, 253

[56] References Cited

U.S. PATENT DOCUMENTS

3,980,557  9/1976  Yall et al. ..................... 210/DIG. 29

FOREIGN PATENT DOCUMENTS

513939  7/1976  U.S.S.R. .................................... 210/11

*Primary Examiner*—Benoit Castel
*Attorney, Agent, or Firm*—Robert E. Burns; Emmanuel J. Lobato; Bruce L. Adams

[57] ABSTRACT

A method of cleaning phosphorus-containing waste water by utilizing microorganisms which are capable of accumulating efficiently organic and inorganic phosphorus compounds in themselves. Such microorganisms are found to belong to the Arthrobacter, Micrococcus, Nocardia, Cellulomonas, Oerskovia, Corynebacterium, Brevibacterium and Kurthia genuses.

5 Claims, No Drawings

METHOD OF CLEANING PHOSPHORUS-CONTAINING WASTE WATER BY MICROORGANISMS

DETAILED DESCRIPTION OF THE INVENTION

Accumulation of organic and inorganic phosphorus compounds in rivers, lakes and coastal seas has recently become one of the important environmental pollution problems. Therefore, development of a system to remove such organic and inorganic phosphorus compounds with microorganisms is very useful.

An attempt has been made to isolate such microorganisms from the natural world as can accumulate much phosphorus compounds in themselves, as a step to achieve the removal of organic and inorganic phosphorus compounds from waste water. The trial led to a finding that microorganisms belonging to the Arthrobacter, Micrococcus, Nocardia, Cellulomonas, Oerskovia, Corynebacterium, Brevibacterium and Kurthia genuses can accumulate considerable quantities of organic and inorganic phosphorus compounds dissolved in water. This invention has been completed on the basis of that finding.

According to a waste water cleaning method of this invention, such microorganisms of the Arthrobacter, Micrococcus, Nocardia, Cellulomonas, Oerskovia, Corynebacterium, Brevibacterium and Kurthia genuses as are capable of accumulating organic and inorganic phosphorus compounds in themselves are cultured in waste water containing such compounds, then the microorganisms are isolated from the water when they have accumulated organic and inorganic phosphorus compounds in themselves.

It has been known that many microorganisms take in phosphorus compounds. But none of such known microorganisms can accumulate considerable quantities of phosphorus compounds. They are incapable of taking in much compounds or readily letting off the compounds once taken in. Unlike such known microorganisms, those used in this invention take in much phosphorus compounds and scarcely release them once they have been taken in.

The microorganisms used in this invention belong to the Arthrobacter, Micrococcus, Nocardia, Cellulomonas, Oerskovia, Corynebacterium, Brevibacterium and Kurthia genuses. Examples are *Arthrobacter globiformis* (ATCC 8010), *Arthrobacter simplex* (ATCC 15799), *Micrococcus luteus* (ATCC 398), *Micrococcus varians* (ATCC 399), *Nocardia erythropolis* (ATCC 4277), *Nocardia restrictus* (ATCC 14887), *Cellulomonas uda* (ATCC 491), *Cellulomonas biazotea* (ATCC 486), *Oerskovia turbata* (ATCC 25835), *Oerskovia xanthineolytica* (ATCC 27402), *Corynebacterium bovis* (ATCC 7715), *Corynebacterium aquaticum* (ATCC 14665), *Brevibacterium linens* (ATCC 9175), *Brevibacterium imperiale* (ATCC 8365), and *Kurthia zopfii* (ATCC 6900).

The method of this invention can remove either or both of organic and inorganic phosphorus compounds from waste water. Examples of the inorganic phosphorus compounds are orthophosphoric acid ($H_3PO_4$), pyrophosphoric acid ($H_4P_2O_4$), polyphosphoric acid ($HPO_3)_x$ and their salts. Examples of the organic phosphorus compounds are alkyl phosphoric acids, such as methyl- and ethyl-phosphoric acids and their derivatives, phenylphosphoric acid and its derivatives, glycerophosphoric acid and its derivatives, and other organic compounds containing phosphoric acid or phosphorus.

To clean waste water containing phosphorus compounds by removing the compounds according to this method, said microorganisms are cultured in the waste water so that the microorganisms take in the phosphorus compounds, then the microorganisms that have accumulated the phosphorus compounds therein are isolated from the water.

The cultivation should preferably be done under aerobic conditions. Better results will be obtained when the pH of the waste water is suitably controlled during cultivation between 3 and 10, preferably between 6 and 8, by adding acid or alkali. If necessary, the temperature of the waste water should be controlled between 25° C. and 40° C.

To increase the efficiency of removing phosphorus compounds, substances supplying carbon, nitrogen, etc. are added as required. The carbon sources are such carbohydrates as glucose, sucrose and starch, organic acids, alcohol, hydrocarbons and any other materials that can be consumed by the microorganisms as nourishment. A more preferable carbon source is other high BOD waste water than the one to be cleaned. The carbon source in such waste water should preferably have a BOD of approximately 1000 ppm by weight minimum.

The nitrogen sources are ammonium salts, ammonia gas, or other waste water containing high percentages of nitrogen.

Further, ion, potassium, magnesium and other ions may be added to the waste water, as required.

The waste water is freed of the organic and inorganic phosphorus compounds when the microorganisms are isolated, after cultivation, by centrifugal isolation or filtration.

The concentration of inorganic phosphoric acid was determined by the ammonium molybdate method. An ammonium molybdate reagent was prepared by mixing together 10 milliliters of a 2.5 percent by weight ammmonium molybdate solution, 10 milliliters of a 10 percent by weight vitamin C solution, and 30 milliliters of a 2 N sulfuric acid ($H_2SO_4$) solution. One milliliter of a specimen liquid containing phosphoric acid and one milliliter of the ammonium molybdate reagent were mixed together, and allowed to react at 37° C. for 1 to 2 hours. Then the concentration of phosphoric acid was colorimetrically determined at 820 nm. Organic phosphorus was determined after decomposing it into phosphoric acid under heat, in the presence of nitric and perchloric acids. The phosphorus in the bacteria cells also was determined in the same way.

EXAMPLE 1

*Arthrobacter globiformis* (ATCC 8010) was inoculated to a culture medium that contained 2.0 g of glucose, 1.0 g of ammonium chloride ($NH_4Cl$), 2.0 g of sodium chloride (NaCl), 1.0 g of sodium sulfate ($Na_2SO_4$), 0.1 g of potassium chloride (KCl), 0.01 g of magnesium chloride ($MgCl_2$), 0.01 g of calcium chloride ($CaCl_2$), 0.01 g of ferric chloride ($FeCl_3$), 0.2 g of potassium dihydrogenphosphate ($KH_2PO_4$), 0.5 g of peptone and 0.1 g of yeast extract, each per liter, and whose pH was adjusted to 7.6 (neutralized by potassium hydroxide (KOH)). The medium was cultured at 30° C. for 24 hours, and was used as seed culture.

In a 500 milliliter flask with shoulder was taken 50 milliliter of an aqueous solution (pH 7.5) containing 100 ppm by weight of inorganic phosphoric acid and added with 2.0 g of glucose, 1.0 g of ammonium chloride (NH₄Cl), 0.01 g of magnesium chloride (MgCl₂), 0.01 g of ferric chloride (FeCl₃), 0.5 g of peptone and 0.1 g of yeast extract, each per liter. The solution was pasteurized by heating, then added with 10 percent (v/v) of said seed culture. The bacteria were cultured with shaking at 30° C. for 40 hours.

After removing the bacteria cells by centrifugal isolation, the concentration of phosphoric acid in the supernatant was determined to be 0.2 ppm by weight. The bacteria cells yielded was 555 milligrams per liter in terms of dry weight. The phosphorus contained in the bacteria cells was determined as 0.180 g of phosphoric acid per g of dry cell weight.

EXAMPLE 2

The microorganisms listed below were cultured by the method described in Example 1. After cultivation, the concentration of phosphoric acid in the supernatant (A), the dry cell weight (B), and the phosphorus content in the cell (C) were determined by the method described in Example 1. The results were as shown in the following table.

| Strain | Results | | |
|---|---|---|---|
| | (A) ppm by weight | (B) mg/l | (C) g/g-dry Cell weight |
| *Arthrobacter globiformis* ATCC 8010 | 0.22 | 550 | 0.19 |
| *Arthrobacter simplex* ATCC 15799 | 0.31 | 520 | 0.18 |
| *Micrococcus luteus* ATCC398 | 0.30 | 530 | 0.20 |
| *Micrococcus varians* ATCC399 | 0.29 | 540 | 0.20 |
| *Nocardia erythropolis* ATCC 4277 | 0.42 | 580 | 0.18 |
| *Nocardia restrictus* ATCC 14887 | 0.37 | 600 | 0.18 |
| *Cellulomonas uda* ATCC 491 | 0.58 | 560 | 0.16 |
| *Cellulomonas biazotea* ATCC 486 | 0.59 | 550 | 0.17 |
| *Oerskovia turbata* ATCC 25835 | 0.63 | 540 | 0.18 |
| *Oerskovia xanthineolytica* ATCC 27402 | 0.65 | 420 | 0.17 |
| *Corynebacterium bovis* ATCC 7715 | 1.0 | 750 | 0.20 |
| *Corynebacterium aquaticum* ATCC 14665 | 1.2 | 820 | 0.16 |
| *Brevibacterium linens* ATCC 9175 | 3.0 | 480 | 0.15 |
| *Brevibacterium imperiale* ATCC 8365 | 3.5 | 460 | 0.15 |
| *Kurthia zopfill* ATCC 6900 | 6.7 | 720 | 0.13 |
| Comparison | | | |
| *Achromobacter lacticum* CCM 69 | 80.0 | 504 | 0.04 |
| *Aerobacter aerogenes* ATCC 7256 | 60.0 | 691 | 0.05 |
| *Flavobacterium heparinum* ATCC 13125 | 75.0 | 440 | 0.06 |

We claim:

1. A method of cleaning phosphorus-containing waste water with microorganisms, which comprises, cultivating in said waste water one or more microoganisms of *Arthrobacter globiformis, Arthrobacter simplex, Micrococcus luteus, Micrococcus varians, Nocardia erythropolis, Nocardia restrictus, Cellulomonas uda, Cellulomonas biazotea, Oerskovia turbata, Oerskovia xanthineolytica, Corynebacterium bovis, Corynebacterium aquaticum, Brevibacterium linens, Brevibacterium imperiale* and *Kurthia zopfii* or mutants or variants thereof capable of efficiently accumulating organic and/or inorganic phosphorus compounds, the pH of said waste water being maintained at about 3 to 10 and the temperature of said waste water being maintained at about 25° to 40° C. during said cultivation, allowing the microorganisms to accumulate said organic and/or inorganic phosphorus compounds therein and then separating the microorganisms.

2. A method according to claim 1 in which at least one microorgansm selected from the group consisting of *Arthrobacter globiformis, Arthrobacter simplex, Micrococcus luteus, Micrococcus varians, Nocardia erythropolis, Nocardia restrictus* is cultivated.

3. A method according to claim 1 in which the pH of the waste water is maintained at about 6 to 8 during the cultivation of said microorganism.

4. A method according to claim 3 in which the pH of the waste water is maintained at about 7.6 during the cultivation of said microorganism.

5. A method according to claim 1 in which the waste water is maintained at a temperature of about 30° C.

* * * * *